US012800927B2

(12) United States Patent
Friedman et al.

(10) Patent No.: US 12,800,927 B2
(45) Date of Patent: Nov. 17, 2026

(54) HOLOGRAPHIC OPTICAL ELEMENT VIEWFINDER

(71) Applicant: META PLATFORMS, INC., Menlo Park, CA (US)

(72) Inventors: Brandon Michael Hellman Friedman, Redmond, WA (US); Brian Wheelwright, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 52 days.

(21) Appl. No.: 18/589,004

(22) Filed: Feb. 27, 2024

(65) Prior Publication Data

US 2024/0288694 A1 Aug. 29, 2024

Related U.S. Application Data

(60) Provisional application No. 63/487,443, filed on Feb. 28, 2023.

(51) Int. Cl.

| | |
|---|---|
| ***G02B 27/01*** | (2006.01) |
| ***G02B 5/32*** | (2006.01) |
| ***G06F 3/01*** | (2006.01) |
| ***H04N 23/53*** | (2023.01) |
| ***H04N 23/63*** | (2023.01) |

(52) U.S. Cl.

CPC ........... *G02B 27/0172* (2013.01); *G02B 5/32* (2013.01); *G02B 27/0179* (2013.01); *G06F 3/013* (2013.01); *H04N 23/53* (2023.01); *H04N 23/631* (2023.01); *G02B 2027/0138* (2013.01); *G02B 2027/0174* (2013.01); *G02B 2027/0178* (2013.01); *G02B 2027/0187* (2013.01)

(58) Field of Classification Search

None

See application file for complete search history.

(56) References Cited

U.S. PATENT DOCUMENTS

| | | | |
|---|---|---|---|
| 4,795,223 | A | 1/1989 | Moss |
| 4,889,780 | A | 12/1989 | Cosner |
| 6,724,991 | B1 | 4/2004 | Chase |
| 8,174,743 | B2 | 5/2012 | Drinkwater |

(Continued)

OTHER PUBLICATIONS

Olwal A., et al., "1D Eyewear: Peripheral, Hidden LEDs and Near-Eye Holographic Displays for Unobtrusive Augmentation," ACM International Symposium on Wearable Computers, Oct. 2018, pp. 184-187.

*Primary Examiner* — Talha M Nawaz

(74) *Attorney, Agent, or Firm* — Greenberg Traurig, LLP

(57) ABSTRACT

Systems, methods, devices, and computer program products are provided for producing observable virtual images. Aspects may include at least one illumination source emitting light on a display and a transparent combining optic including a holographic optical element (HOE). According to various examples, light emitted from the at least one illumination source illuminates the transparent combining optic, and the transparent combining optic diffracts the light to generate an observable virtual image. The observable virtual image may be positioned to overlay a scene viewable through the transparent combining optic. Such aspects may be incorporated on a variety of technologies, such as head-mounted display systems, smart glasses, and/or AR devices.

16 Claims, 13 Drawing Sheets

(56) References Cited

U.S. PATENT DOCUMENTS

| | | | | |
|---|---|---|---|---|
| 8,593,710 | B2 | 11/2013 | Renaud-Goud | |
| 9,720,234 | B2 | 8/2017 | Border et al. | |
| 9,933,622 | B2 | 4/2018 | Border et al. | |
| 10,210,844 | B2 | 2/2019 | Kollin et al. | |
| 10,345,589 | B1 | 7/2019 | Son | |
| 10,578,867 | B2 | 3/2020 | Nguyen et al. | |
| 11,181,979 | B2 | 11/2021 | Eash et al. | |
| 11,320,571 | B2 | 5/2022 | Brown et al. | |
| 11,474,358 | B2 | 10/2022 | Meitav et al. | |
| 11,550,388 | B2 | 1/2023 | Eash et al. | |
| 11,567,263 | B2 | 1/2023 | Cotton | |
| 12,498,572 | B2 * | 12/2025 | Shwartz | G02B 5/1828 |
| 2003/0151786 | A1 | 8/2003 | Drinkwater | |
| 2006/0001937 | A1 | 1/2006 | Drinkwater | |
| 2013/0141527 | A1 | 6/2013 | Shimizu et al. | |
| 2015/0205115 | A1 | 7/2015 | Border et al. | |
| 2015/0205131 | A1 | 7/2015 | Border et al. | |
| 2016/0018647 | A1 | 1/2016 | Osterhout et al. | |
| 2020/0150425 | A1 | 5/2020 | Hatzilias et al. | |
| 2020/0333601 | A1 | 10/2020 | Yang et al. | |
| 2021/0356910 | A1 | 11/2021 | Zhang et al. | |
| 2022/0146827 | A1 | 5/2022 | Vallius et al. | |
| 2022/0221720 | A1 * | 7/2022 | Shin | G06T 19/006 |
| 2022/0381968 | A1 | 12/2022 | Rainouard et al. | |
| 2022/0413603 | A1 * | 12/2022 | Held | G02B 27/0093 |
| 2023/0161158 | A1 * | 5/2023 | Belkin | G02B 27/0172<br>359/630 |
| 2023/0161159 | A1 * | 5/2023 | Belkin | G02B 27/0025<br>359/630 |
| 2023/0251487 | A1 * | 8/2023 | Hwang | G02B 5/32<br>359/630 |
| 2024/0264564 | A1 * | 8/2024 | Kühl | B60K 35/10 |
| 2024/0402496 | A1 | 12/2024 | Volkov | |

* cited by examiner

HOLOGRAPHIC OPTICAL ELEMENT VIEWFINDER

CROSS-REFERENCE TO RELATED APPLICATIONS

This application claims the benefit of U.S. Provisional Application No. 63/487,443 filed Feb. 28, 2023, the entire content of which is incorporated herein by reference.

TECHNOLOGICAL FIELD

Examples of the present disclosure relate generally to systems, methods, apparatuses, and computer program products for utilizing holographic optical elements and generating observable virtual images.

BACKGROUND

Augmented reality (AR) is a form of reality that has been adjusted in some manner before presentation to a user, which may include, e.g., a virtual reality (VR), an augmented reality (AR), a mixed reality (MR), a hybrid reality, or some combination and/or derivatives thereof. AR, VR, MR, and hybrid reality devices often provide content through visual means, such as through a headset or glasses.

Many augmented reality devices utilize displays to present information, render additive information and/or content on top of the physical world, and execute various AR operations and simulations. For example, an augmented reality device may display a virtual image overlaid on top of objects in the real world.

Smart devices, such as wearable technology and AR glasses may include a camera and a display. Given the camera capability, the device users may want to capture a photo. In some cases, the device may provide a viewfinder shown within the display field of view that allows the user to visualize the composition of the photo or video frame to be captured. If the display is used as the viewfinder, there is often a significant power requirement since camera data may be processed through a graphics pipeline and sent to a driving display. The user experience is often poor, especially when the display provides a low-resolution thumbnail much smaller than a full captured field of view (FOV), and likely partially see-through in an instance in which the display has low brightness without occlusion. These challenges are similar to those faced when attempting to capture photos with a phone or camera device, and may not directly view the events, since they are looking at the tiny display rather than the event or subject they intend to capture.

In addition, waveguide displays are generally more limited in the field of view compared to the camera (e.g., a display FOV of 30 degrees (deg.), camera FOV of 50 deg.), as well as in resolution. Some AR displays, like liquid crystal on silicon (LCOS), liquid crystal display (LCD) or digital micromirror device (DMD), may require full illumination, even if only a small segment of the field of view holds content. These displays are typically inefficient in showing extremely sparse content, like only a clock in the corner of the field of view, and generally require a significant power draw. Accordingly, improved techniques are needed to address present drawbacks.

BRIEF SUMMARY

In meeting the described challenges, examples of the present disclosure provide systems, methods, devices, and computer program products utilizing holographic optical elements (HOEs) and producing observable virtual images. Various examples may include at least one illumination source emitting light, and a transparent combining optic comprising a holographic optical element. The light emitted from the illumination source may illuminate the transparent combining optic, including the holographic optical element, and the transparent combining optic may diffract the light to generate an observable virtual image. The observable virtual image may be positioned to overlay a scene viewable through the transparent combining optic. In some examples, the transparent combining optic, including the HOE, may diffract the light to project the observable virtual image on a display.

In an example of the present disclosure, a system may be provided. The system may include a transparent combining optic including a holographic optical element. The holographic optical element may be configured to diffract light emitted from an illumination source illuminating the holographic optical element. The holographic optical element may also be configured to diffract the light to generate an observable virtual image positioned to overlay a scene viewable through the transparent combining optic.

In one example of the present disclosure, a method may be provided. The method may include emitting light from an illumination source. The method may further include diffracting the light emitted from the illumination source by utilizing a holographic optical element to generate an observable virtual image positioned to overlay a scene viewable through the transparent combining optic.

In yet another example of the present disclosure, a computer program product is provided. The computer program product may include at least one non-transitory computer-readable medium including computer-executable program code instructions stored therein. The computer-executable program code instructions may include program code instructions configured to emit light from an illumination source. The computer program product may further include program code instructions configured to facilitate diffraction of the light emitted from the illumination source. The light may be diffracted by a holographic optical element to generate an observable virtual image positioned to overlay a scene viewable through the transparent combining optic.

In some examples of the present disclosure, the illumination source may include a plurality of illumination sources, such as for example a variable illumination source or an array of illumination sources separated spatially and/or differing in spectrum. Illumination sources may separately emit light to illuminate the HOE, and in some examples, a first illumination source and a second illumination source may project different images when diffracted by the HOE.

As discussed herein, the display which may present the observable virtual image, caused by the HOE diffracting the light and projecting the observable virtual image, may be included on a wearable system, such as a head-mounted display system. In some examples of the present disclosure, the head-mounted display system is at least one of a headset, glasses, helmet, visor, gaming device, or a smart device. The display may form part or all of one or more lenses, such as one or more lenses on a glasses frame. As such, the observable virtual image projected by the display may provide a virtual image that may be observed by a user wearing the glasses. In some examples, a plurality of observable virtual images may be provided on the display. One or more images may be selectable, and include, for example, a time, a letter, a number, a shape, or an icon. At least one of the observable virtual images may be selectable. For example, when used with an eye tracking system, information indicative of a user focusing on or looking at the observable virtual image may cause one or more actions to be taken. Such action may include, for example, taking an image of a scene captured by one or more cameras associated with the system, selecting an icon (e.g., opening up an application or feature associated with the icon, etc.), and/or the like.

Various systems, methods, devices, computer program products and examples of the present disclosure may include at least one camera capturing a scene, wherein an observable virtual image is associated with and/or highlights/represents or projects a section of the scene captured by the camera (e.g., a border indicating the region of capture). An eye tracking system may track at least one eye viewing the scene, may determine a region of the scene corresponding to the tracked eye movement, and may update the observable virtual image to highlight/represent and/or project the region of the scene. The region may then be captured in a photograph/image and/or a video.

In some additional examples of the present disclosure, the illumination may include a first illumination source and a second illumination source separately emitting light, a multiplexed HOE, and a plurality of observable virtual images projected on the display. In other examples, the illumination source may be a variable illumination source, the HOE may be multiplexed, and at least one of the plurality of observable virtual images may be selectable.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The summary, as well as the following detailed description, is further understood when read in conjunction with the appended drawings. For the purpose of illustrating the disclosed subject matter, there are shown in the drawings examples of the present disclosure; however, the disclosed subject matter is not limited to the specific methods, compositions, and devices disclosed. In addition, the drawings are not necessarily drawn to scale. In the drawings.

Figure 1A:
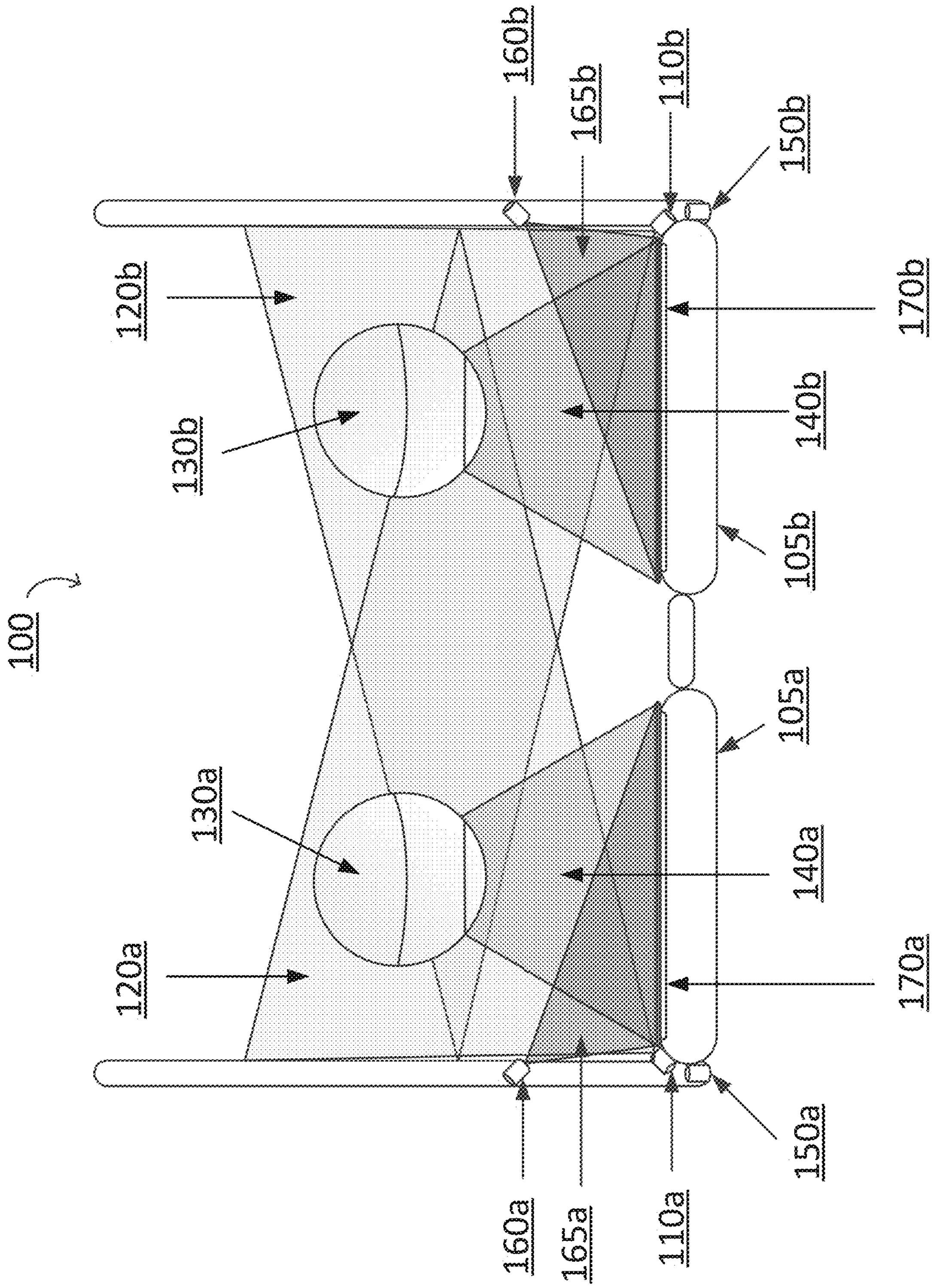
FIG. 1A illustrates an example holographic optical element system, in accordance with various aspects discussed herein.

The figures depict various examples for purposes of illustration only. One skilled in the art will readily recognize from the following discussion that alternative examples of the structures and methods illustrated herein may be employed without departing from the principles described herein.

DETAILED DESCRIPTION

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Some examples of the present invention will now be described more fully hereinafter with reference to the accompanying drawings, in which some, but not all examples of the invention are shown. Indeed, various examples of the invention may be embodied in many different forms and should not be construed as limited to the examples set forth herein. Like reference numerals refer to like elements throughout. As used herein, the terms "data," "content," "information" and similar terms may be used interchangeably to refer to data capable of being transmitted, received and/or stored in accordance with examples of the invention. Moreover, the term "exemplary", as used herein, is not provided to convey any qualitative assessment, but instead merely to convey an illustration of an example. Thus, use of any such terms should not be taken to limit the spirit and scope of examples of the invention.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a Metaverse may denote an immersive virtual space or world in which devices may be utilized in a network in which there may, but need not, be one or more social connections among users in the network or with an environment in the virtual space or world. A Metaverse or Metaverse network may be associated with three-dimensional virtual worlds, online games (e.g., video games), one or more content items such as, for example, images, videos, non-fungible tokens (NFTs) and in which the content items may, for example, be purchased with digital currencies (e.g., cryptocurrencies) and/or other suitable currencies. In some examples, a Metaverse or Metaverse network may enable the generation and provision of immersive virtual spaces in which remote users may socialize, collaborate, learn, shop and engage in various other activities within the virtual spaces, including through the use of Augmented/Virtual/Mixed Reality.

References in this description to "an example", "one example", or the like, may mean that the particular feature, function, or characteristic being described is included in at least one example of the present invention. Occurrences of such phrases in this specification do not necessarily all refer to the same example, nor are they necessarily mutually exclusive.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, may also be provided in combination in a single embodiment. Conversely, various features of the disclosed subject matter that are, for brevity, described in the context of a single embodiment, may also be provided separately or in any sub-combination. Further, any reference to values stated in ranges includes each and every value within that range. Any documents cited herein are incorporated herein by reference in their entireties for any and all purposes.

In various aspects, systems, methods, devices, and computer program products utilize holographic optical element (HOE) to produce observable virtual images. The techniques and aspects discussed herein differentiate and improve upon conventional systems, at least by eliminating pixelated displays, and providing unique methods for providing virtual observable images, on various systems, such as for example wearable technology, smart glasses, and other head-mounted display systems. The HOE-based projection systems, methods, devices, and computer program products further provide improved, and optionally selectable and interactive visualizations, thereby providing an enhanced user experience and enhanced capabilities.

FIG. 1A illustrates an example implementation of HOE-based system in accordance with aspects discussed herein. FIG. 1A illustrates a plan view of an example system including system 100, on which various techniques may be applied. In some examples, the system 100 may be utilized in a Metaverse network. In other examples, the system 100 may be utilized in any suitable network capable of provisioning content and/or facilitating communications among entities within or associated with the network. In some examples, the system 100 may include an AR/VR glasses headset. It should be appreciated that the various sensors and techniques may be applied to a range of applications, including but not limited to other head-mounted devices, headsets, helmets, visors, gaming devices, smart devices, and other wearable technology, including glasses that do not include digital pixelated displays.

A Holographic Optical Element (HOE) 170*a*, 170*b* may be placed on a lenses 105*a*, 105*b* (also referred to herein as lens system(s) 105*a*, 105*b*) or a waveguide of the system 100 (e.g., AR smart glasses). A corresponding illumination source (e.g., a laser, a light emitting diode (LED), etc.) located on the glasses (e.g., illumination source 160*a*, 160*b*) illuminates the HOE over a projection frustum 165*a*, 165*b* which may uniformly or non-uniformly illuminate the HOE according to the design. The recording within the HOE receives light from projection frustums 165*a*, 165*b* and diffracts or redirects this light into particular angles toward the user's eyes 130*a*, 130*b*, delivering a static virtual image. This static virtual image may subtend a significantly larger angle than any dynamic display incorporated into lenses 105*a*, 105*b*, such as a waveguide display.

It should be appreciated that the static projection is not limited by the field of view of a waveguide. The HOE may include multiple HOEs and the illumination source may be an illumination system including multiple illumination sources or a variable illumination source. Each different illumination source, or variable source mode, may project a different static image (e.g., multiplexing across sources and HOEs). Various types of HOEs, including but not limited to multiplexed HOEs, may be compatible with system 100, glasses, smart glasses, glasses with AR displays, and various combinations discussed herein, whether the AR display is waveguide-based or uses another AR combining architecture.

According to some aspects, the HOE may be transparent and placed on glass, e.g., lens 105. The HOE may include many layers or many exposures, each layer or exposure is multiplexed to a unique illumination trait. Different or changing sources "turn on" each projection. For example, a first color source (e.g., a green source) illuminating the HOE may "turn on" the rectangular box line viewfinder showing the photo field of view (FOV) (e.g., 60×80 degrees). A second color source (e.g., a red source) may "turn on" a different size rectangular box showing the video FOV (e.g., 40×40 deg). Accordingly respective observable images may be generated from separate illumination sources.

In various examples, HOE multiplexing may be in any wavelength, polarization, angle, or any other know optical multiplexing technique. Many types of HOEs may be utilized including Volume Bragg Grating (VBG), Polarization Volume Holograms (PVH), Surface Relief Gratings (SRG), meta surface, etc. LED illumination could be used by a broadband HOE, or by multiple exposures at different wavelengths within an LED to increase the effective bandwidth to match the LED.

In various examples, as illustrated in FIG. 1A, right eye 130*a* and left eye 130*b* may be positioned behind a respective lens system, e.g., right lens 105*a* and left lens 105*b*. The lens system may be configured to provide a visual display. A right eye sensor system 110*a* may capture a field of view 120*a* which includes the right eye 130*a*, and track movements of the right eye. A left eye sensor system 110*b* may capture a field of view 120*b* which includes the left eye 130*b*, and track movements of the left eye. In some instances, one or both sensor systems, e.g., 110*a*, 110*b*, may have a field of view which includes one or both eyes. In some examples, eye tracking information for one or both eyes, captured by a single sensor system may be used. In other examples, a sensor system may focus on a single eye, even if both eyes are within its field of view. Variations and combinations or sensor information and eye information may be adjusted based on a type of sensor desired information, and other application characteristics and factors, including but not limited to latency, power consumption, accuracy, and the like.

In various examples, the sensor systems may be positioned outside of a field of view of an eye, particularly, the eye which is being tracked by the sensor. As illustrated in FIG. 1A, right eye sensor system 110*a* is positioned outside of the right eye field of view 140*a*, and left eye sensor system 110*b* is positioned outside of the left eye field of view 140*b*. Such positioning prevents obstruction, distraction, and other discomfort or annoyance which may arise with the sensor system being within an eye's field of view. Such positioning further enables seamless operation, and in some cases, presentation of visual content on a lens system 105*a*, 105*b*.

The right eye sensor system 110*a* may track the right eye 130*a* using a first tracking method, and the left eye sensor system 110*b* may track the left eye 130*b* using a second tracking method different from the first sensor system. In various examples, the tracking may be visual tracking, for example, using a camera, photosensor oculography (PSOG), event-based tracking, which may occur in real-time, range imaging, and time of flight techniques, including indirect time of flight (iTOF) techniques, among others.

The tracked eye movement information from both eyes may be processed via a computing system including a processor and non-transitory memory. The computing system and processing may occur locally, remotely, or both, with some processing operations happening locally and others remotely. Remote processing may occur over network, via a cloud computing network as discussed herein, or via one or more servers, devices, and systems in remote network communication with the system 100.

The tracked eye movements from the left and right eye may be correlated to determine a gaze motion pattern, which may be a three-dimensional gaze motion pattern. Correlating tracking information may include determining a convergence pattern or divergence pattern based on the tracked movement of both eyes. Such convergence and divergence patterns may indicate whether an eye is focusing on something near or far. Based on that contextual information, the gaze motion pattern may be determined to be a two-dimensional or three-dimensional gaze motion pattern.

In various examples, at least one sensor system 150*a*, 150*b* may capture a scene. The sensor system 150*a*, 150*b* may include a camera, and/or be outward facing. The sensory system 150 may capture a live scene, similar to the live scene observed by the eyes 130. In examples, the sensor system 150 may be embedded within, placed upon, or otherwise affixed or secured to the glasses frame. The sensor system 150 may capture a scene, and the observable virtual image may project at least a portion of the scene onto the display system. As such, the tracked eye movements may be utilized to determine a region of the scene corresponding to the tracked eye movements, and the observable virtual image may be updated to display the region of the scene. Such scene information may be utilized to determine one or more observable virtual images to display, as well as optionally determining a position of the virtual image (e.g., not blocking an area of interest within the scene or where the eyes are looking, etc.).

In various examples, respective sensor systems determine a motion pattern based on the tracked eye movements. The two motion patterns, i.e., from each eye, may be combined to determine a gaze motion pattern, indicative of where the user is looking and focusing. Such motion pattern identification and gaze determinations may occur in real-time, and/or with very minimal (e.g., a millisecond or less) latency. In certain AR/VR applications, such as gaming, or operation of smart glasses, such speeds may be crucial for a seamless and satisfying experience using the product. For example, a visual display may provide content, such as pictures, video, text, animations, etc., on a lens system (e.g., lens systems 105*a*, 105*b*). Such content may be shifted, selected, interacted with, or responsive to a gaze. Thus, fast and accurate eye tracking may be necessary to enable such interactions. Therefore, in some aspects, the determined gaze pattern, from the correlated eye tracking data, may cause a visual display to project visual content in response to the determined gaze pattern. The heterogeneous nature of the two sensor systems further enables such interactions and interactions with improved speed, power consumption, latency, and other characteristics, as discussed herein.

As one example, a camera may have a dense image information, thus being able to achieve high accuracy. However, such camera's power consumption may be very high. An iTOF sensor could achieve lower power consumption, but its accuracy may be low. Therefore, a camera may track one eye, and an iTOF sensor may track the other eye. Then, the information between two eyes may be correlated, and the two measurements fused together to achieve a high accuracy measurement, with a lower overall power consumption than a two-camera solution, and higher accuracy than a two iTOF sensor solution.

Figure 1B:
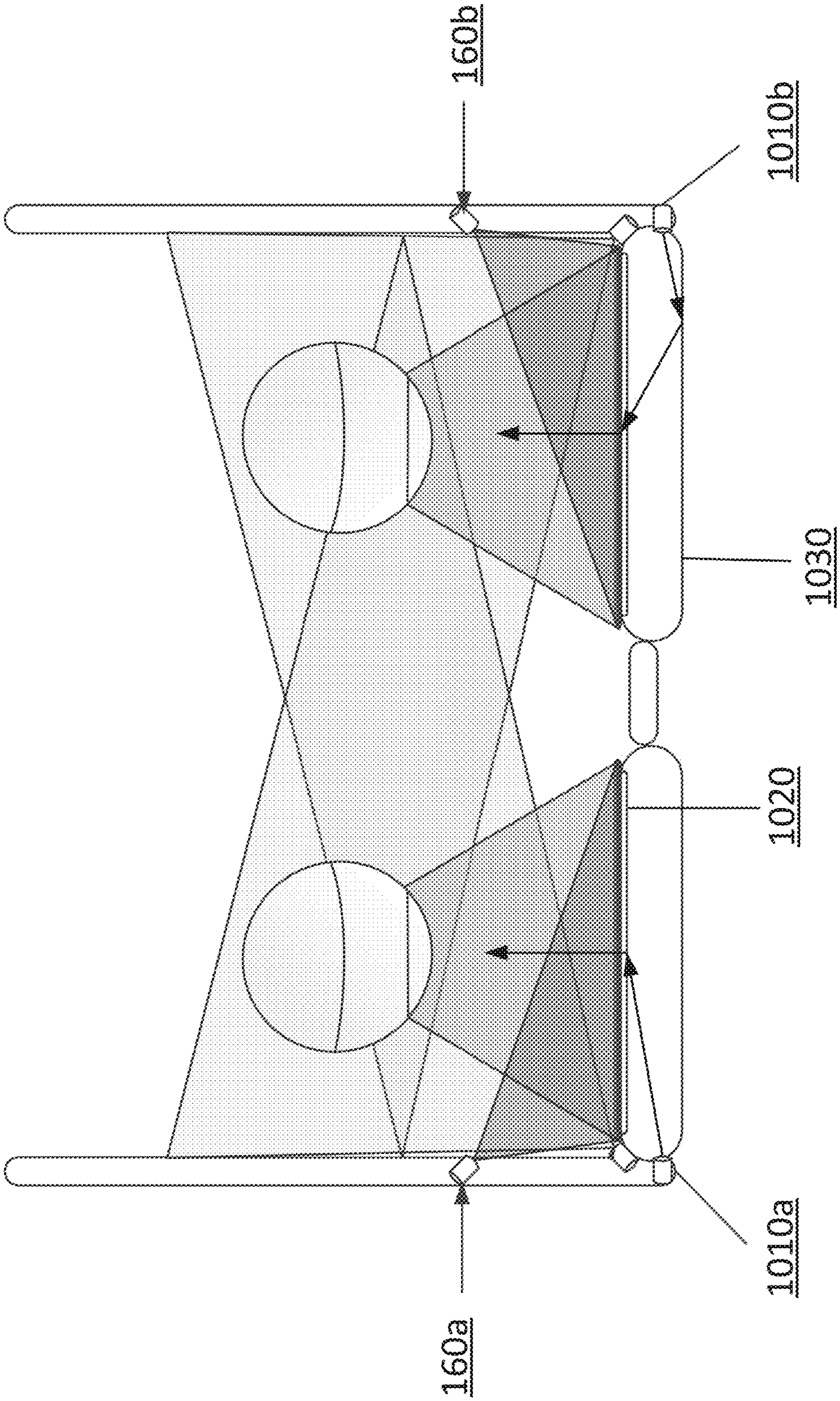
FIG. 1B illustrates an example holographic optical element system with a waveguide illumination, in accordance with various aspects discussed herein.
Figure 1C:
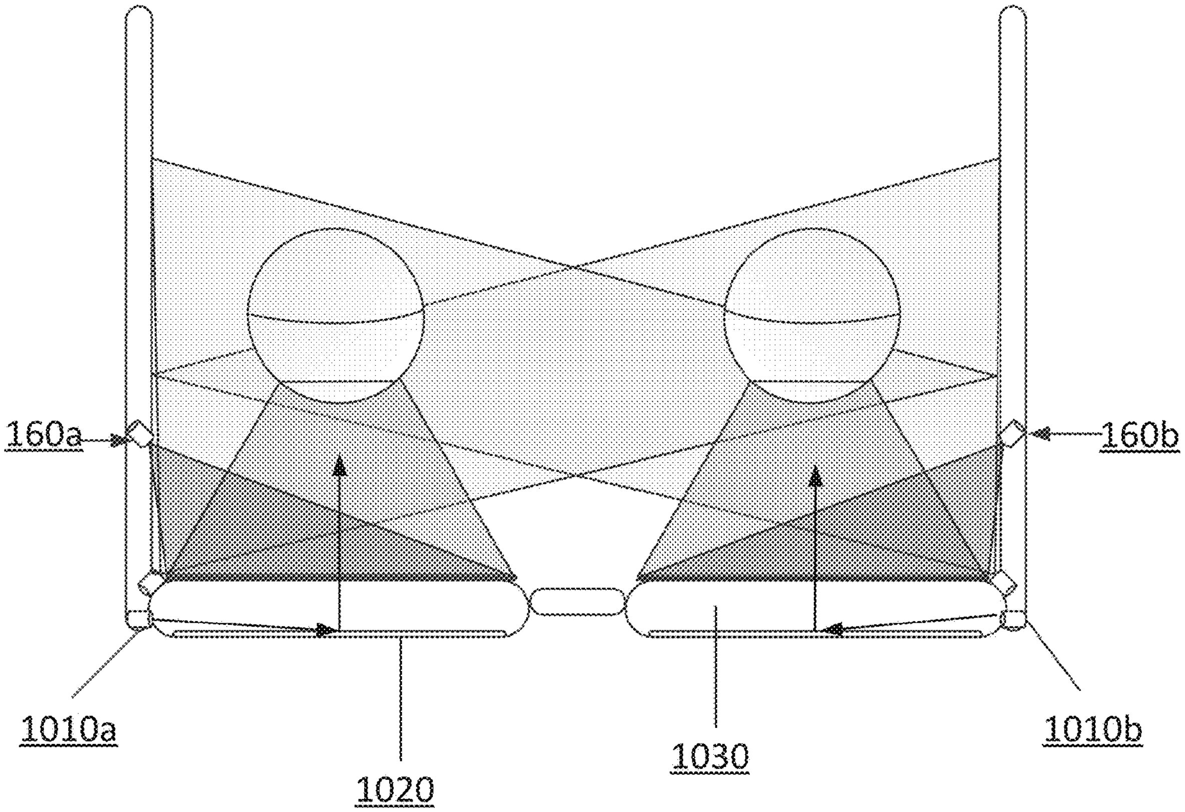
FIG. 1C illustrates another example holographic optical element system with a waveguide illumination, in accordance with various aspects discussed herein.

As another example, FIGS. 1B and 1C illustrate various illumination system and waveguide placements for HOE-based technologies as discussed herein. In FIGS. 1B and 1C, illumination systems 1010 are provided in a frame, such as a glasses frame. The illumination system 1010 may include one or more illumination sources (e.g., illumination source 160*a*, illumination source 160*b*) for a hologram. The illumination generated by the one or more illumination sources of the illumination system 1010 may propagate from the illumination system 1010 through a waveguide combiner to generate a hologram. The illumination system may create a light path that travels through a waveguide and an HOE to illuminate a hologram. In examples, after the waveguide propagation and hologram diffraction, the light may be directed from the HOE and waveguide through free-space propagation to the eye.

FIG. 1B provides an example of a light path for a transmissive hologram (e.g., light paths 1015, 1025), and illustrates that the HOE may be on a side of the lens 1030 nearest to an eye. FIG. 1C provides an example of a light path for a reflective hologram (e.g., light path, 1035), and illustrates the HOE 1020 may be placed on a side of a lens furthest from an eye. FIG. 1B shows two possible light paths. A first light path is shown indicating light propagating from an illumination system 1010 through the waveguide 1030 (e.g., a waveguide combiner) and an HOE 1020 to the hologram. The second light path is shown indicating light reflecting within the waveguide 1030 before propagating through the HOE 1020 to the hologram. FIG. 1C illustrates a reflective light path, in which light transmits through the waveguide 1030 to the HOE 1020 and reflects light through the waveguide 1030 to an eye. In various examples, the waveguide 1030 (e.g., a waveguide combiner) may, but need not, be curved. Any combination of the above techniques may be utilized in accordance with heterogeneous eye tracking, correlation, and gaze motion pattern determinations discussed herein. Various combinations may be useful to achieve certain goals or thresholds related to one or more of latency, bandwidth, power consumption, accuracy, or resolution, among others.

Figure 2:
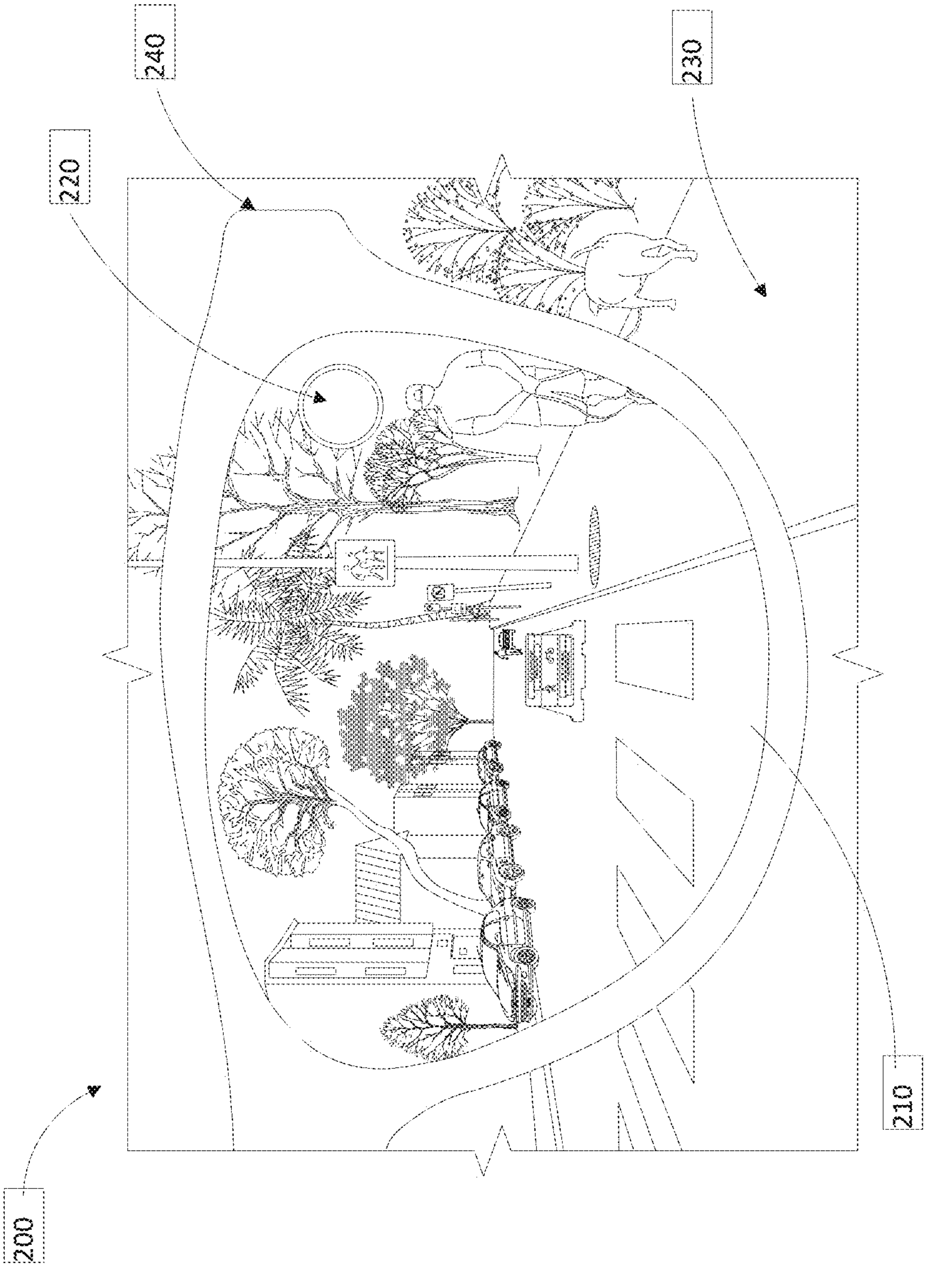
FIG. 2 illustrates another example of display with an observable virtual image, in accordance with various aspects discussed herein.

FIG. 2 illustrates an example of a display with a projected observable virtual image, in accordance with aspects discussed herein. A head-mounted system 200 may include a glasses frame and a display 210 enabling a view of a real-life or live scene 230. An observable virtual image 220 (also referred to herein as virtual image 220) may be provided on the display 210 of the head-mounted system 200. For example, the display 210 may correspond to a lens region of the glasses frame, and the observable virtual image 220 may be placed within the display area (see, e.g., display 210). In an example, the virtual image 220 may be an icon, such as for example a colored icon, a number, text, or other graphic. In other examples, the virtual image may be a static virtual image, and may comprise one or more icons. Icons may be driven by one or more sources, or even multiple segments of a segmented display. According to various aspects, the virtual image 220 may be placed in a static position. For example, the time may always be placed in the display region position shown in FIG. 2. The display region is associated with the display (e.g., display 210). In other examples, the virtual image may be dynamic, toggled on/off, and/or moved to various positions, for example, according to user preferences or settings.

Figure 3A:
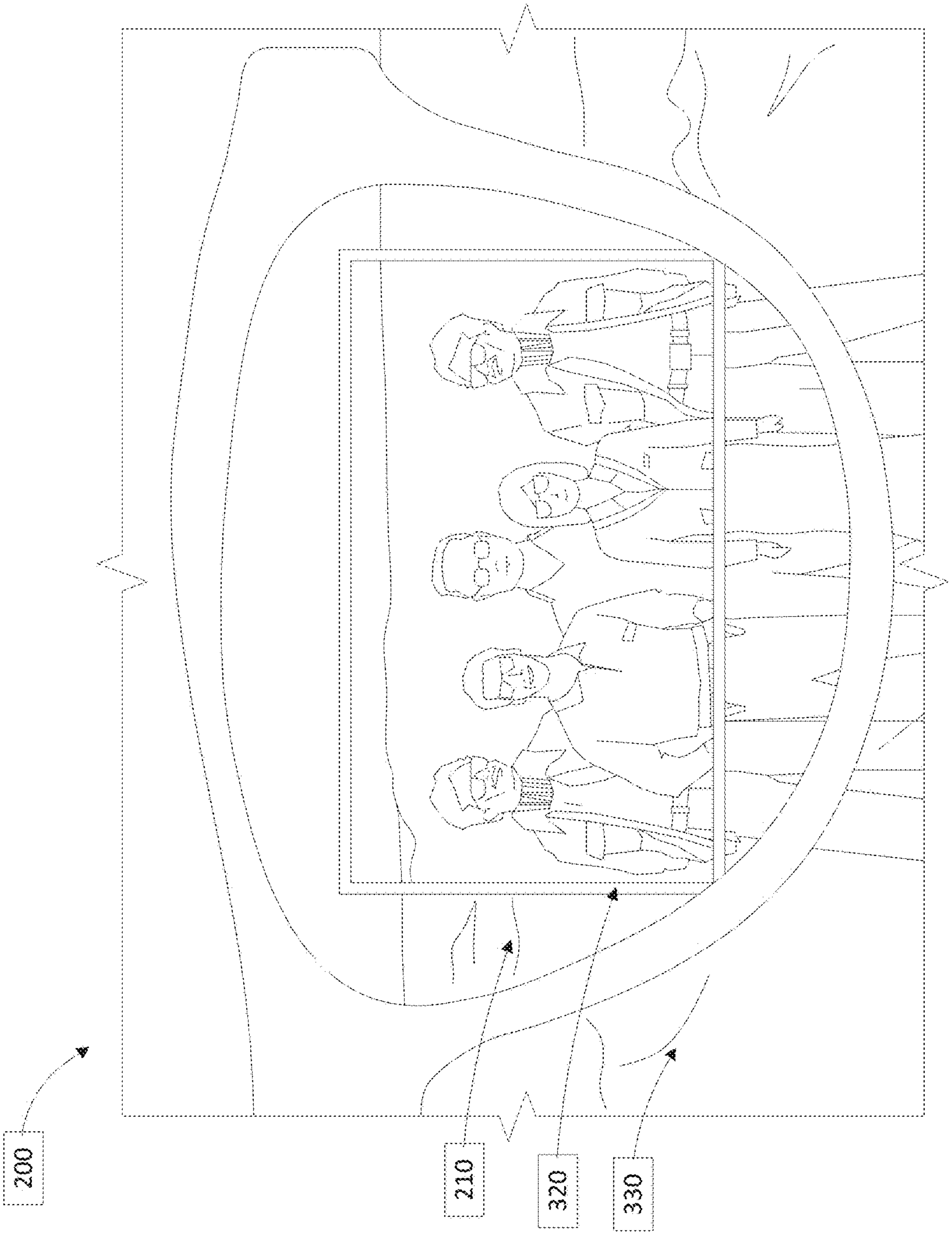
FIG. 3A illustrates a viewfinder display in accordance with various aspects discussed herein.

FIG. 3A illustrates an example, wherein an observable virtual image 320 may be utilized to aid in taking an action, such as capturing a photograph and/or a video. In a similar head-mounted system 200, the observable virtual image 320 may be a bounding box or a frame around a region of interest. The region of interest is outlined on a display (e.g., display 210) by the virtual image 320. The region of interest may be a region of viewable area 320 of a scene 330. In various examples, an action, such as taking a photo and/or a video may be captured, corresponding to the area within the virtual image 320. This may enable individuals wearing and using the head-mounted system 200 to take photographs and/or videos, without many of the viewfinder challenges discussed herein, and illustrated in FIG. 3B. This may allow the user of the head-mounted system to capture an image while directly enjoying the scene. In other words, a photograph and/or video may be captured as the user is directly looking at the scene, rather than traditional photography and videography, wherein a user looks at the scene through a scree in order to capture the desired view.

In some aspects, similar to other examples discussed herein, the virtual image 320 may be a static image corresponding to a region of the scene that the user is looking at, as determined by the eye tracking system (e.g., camera(s) 110*a*, 110*b*).

According to various aspects, the observable virtual image 320 may be a selectable virtual image. The selectable aspects may enable one or more actions and/or interactions to be performed. Selections may occur, for example, using a physical and/or virtual button or selection on the head-mounted system 200, such as a button placed on the glasses frame 240. In another example, the physical and/or virtual button may be on a connected device, such as for example a mobile computing device, remote control, or other computing device or peripheral as discussed herein. In some examples, selection and/or interaction may occur based on tracked eye movements. Focusing on an area, region, and/or virtual image for a period of time (e.g., 10 milliseconds, 1 second, 2 seconds, etc.) may cause an action to be taken, such as capturing a photo, initiating a video recording, and/or other action(s). Likewise, tracked eye movements indicating that the user is looking elsewhere and/or is not interested in the virtual image or virtual image region may cause the virtual image (e.g., observable virtual image 320) to move or turn off (e.g., by the head-mounted system 200).

Figure 3B:
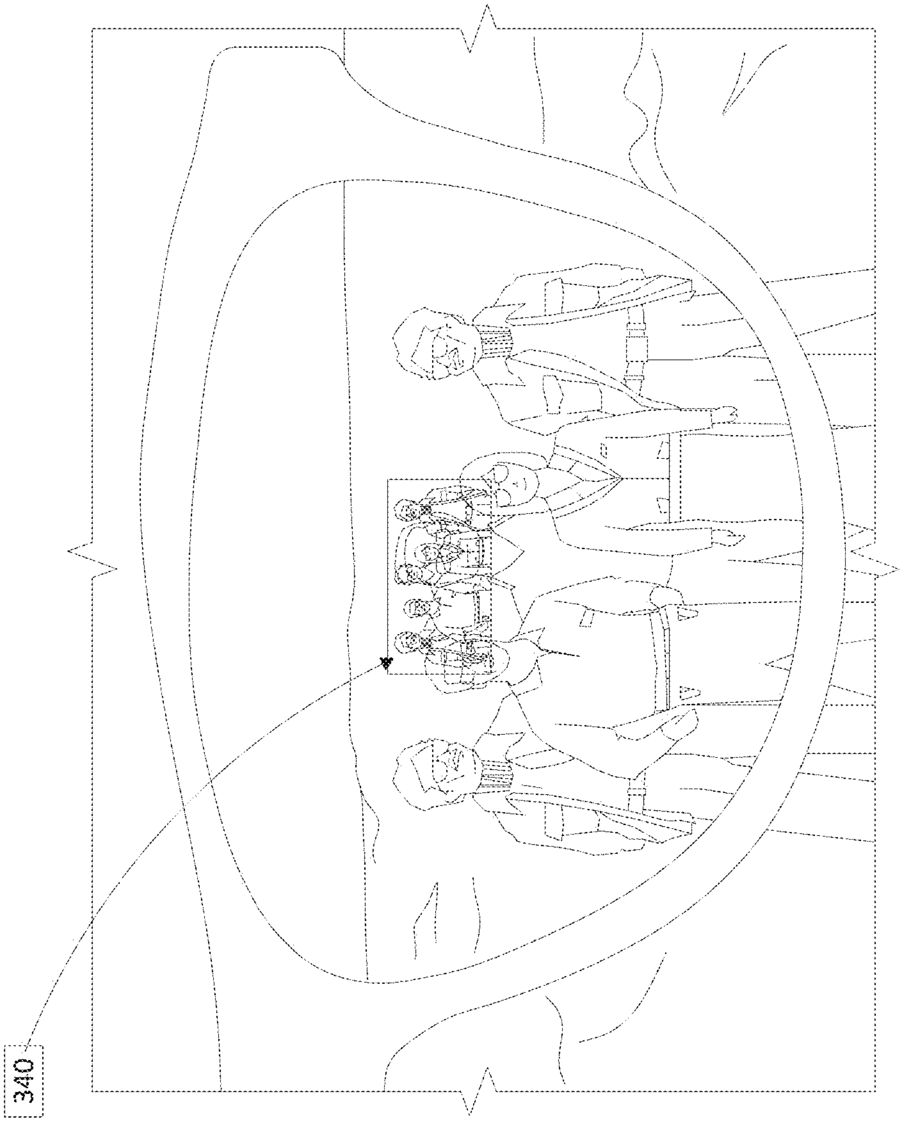
FIG. 3B illustrates another example of a viewfinder display in accordance with various aspects discussed herein.

FIG. 3B illustrates a viewfinder display, wherein the region to be captured by a camera is displayed in a miniaturized replication 340 on a display (e.g., a waveguide display with limited field of view). Such implementations may have many of the challenges discussed above, with respect to power consumption, user experience, user comfort, and ease of viewing. Since the display provides an additive picture over the generated scene, the viewer may need to switch their gaze and focus between the competing images (e.g., the additive picture and the generated scene). This may create an uncomfortable user experience and eye straining.

Figure 4:
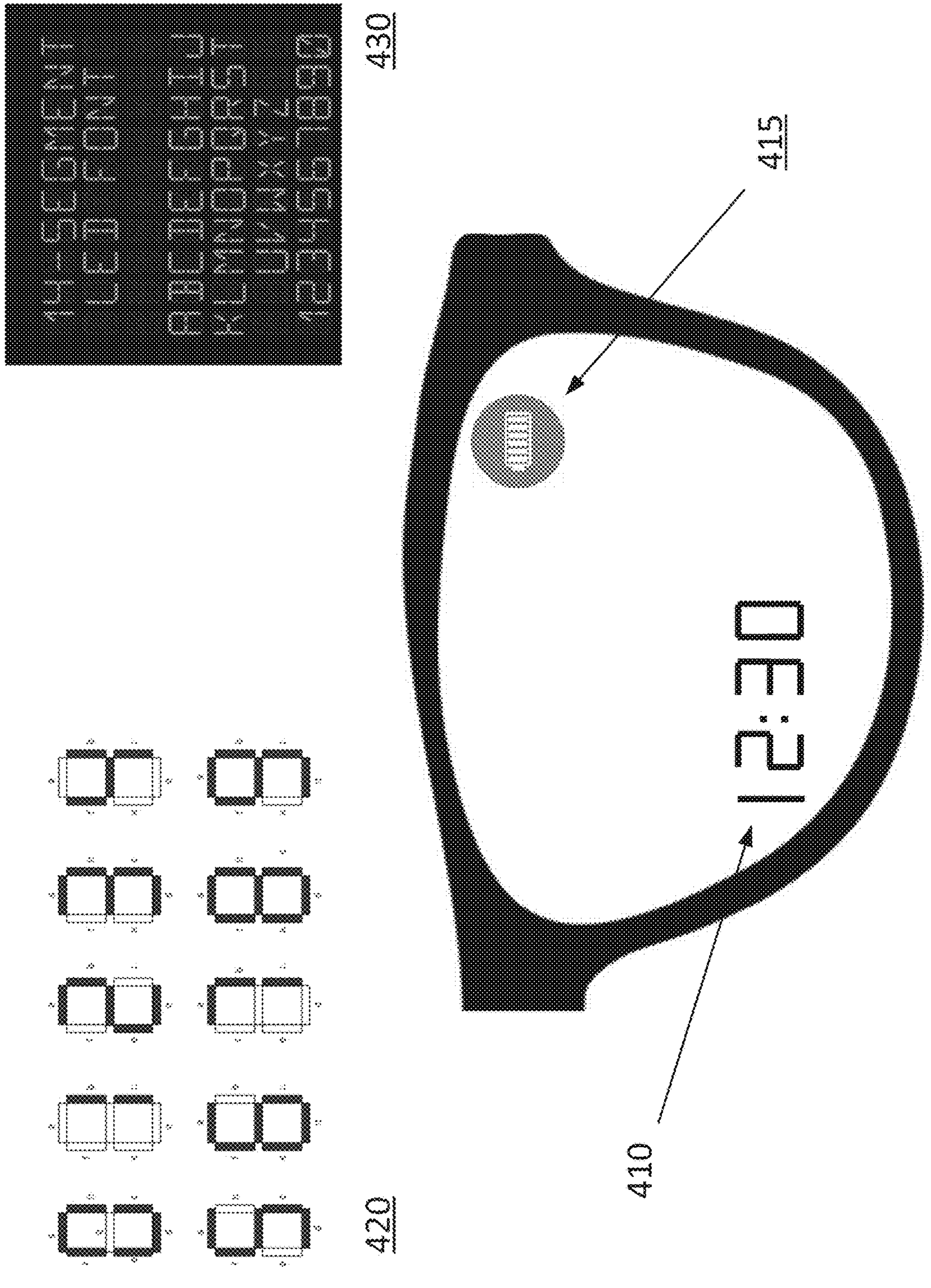
FIG. 4 illustrates various observable virtual images, in accordance with various aspects discussed herein.

FIG. 4 illustrates various observable virtual images that may be generated and/or utilized in accordance with various aspects discussed herein. Numbers, texts, icons, images, and any of a plurality of visualizations may be provided by the HOE systems and methods discussed herein. For example, numbers and letters may be generated using a seven-segment display 420 or a fourteen-segment display 430. As discussed herein, virtual images may provide a time 410, an icon 415, such as a power level or other indication of system information. The virtual images may be positioned anywhere within the display region defined by display 210, turned on or off, moved, selected, and/or interacted with, as discussed herein. For example, the virtual images may be moved from a central area of the display 210 to a corner of the display. In some examples, the virtual images may be moved outside of a line of sight of the user, so that the user can more clearly and directly see the scene. In other examples the virtual images are turned off so as to not impede a user's view of the scene. The position changes may occur, for example, due to a user gaze or other inference based on a user's gaze (e.g., a user looks in a different area for a period of time).

In addition, it should be appreciated that HOEs may maintain high efficiency and transparency in an instance in which a low number of layers and/or exposures are used. Dynamic functionality may be made with finite symbols (e.g., like the fixed symbols on a car dash, like the engine light, the battery light, etc.). This may be very power efficient and provide significant power advantages compared to traditional displays. Increased functionality may be realized utilizing certain displays, e.g., the 7-segment displays 420 or 14-segment displays 430, or similar displays, for numbers and/or text.

In addition, separate HOEs may be utilized for various aspects of one or more virtual images. For instance, a clock may be made with one HOE for the "1" (double digit hour), one HOE for the ":", and three 7-segment displays for a total of 23 HOE exposures. It should be appreciated that any of a combination of HOE types, symbols, icons, numbers, letters, colors, images, and/or the like may be utilized and implemented in accordance with various aspects provided herein.

Figure 5:
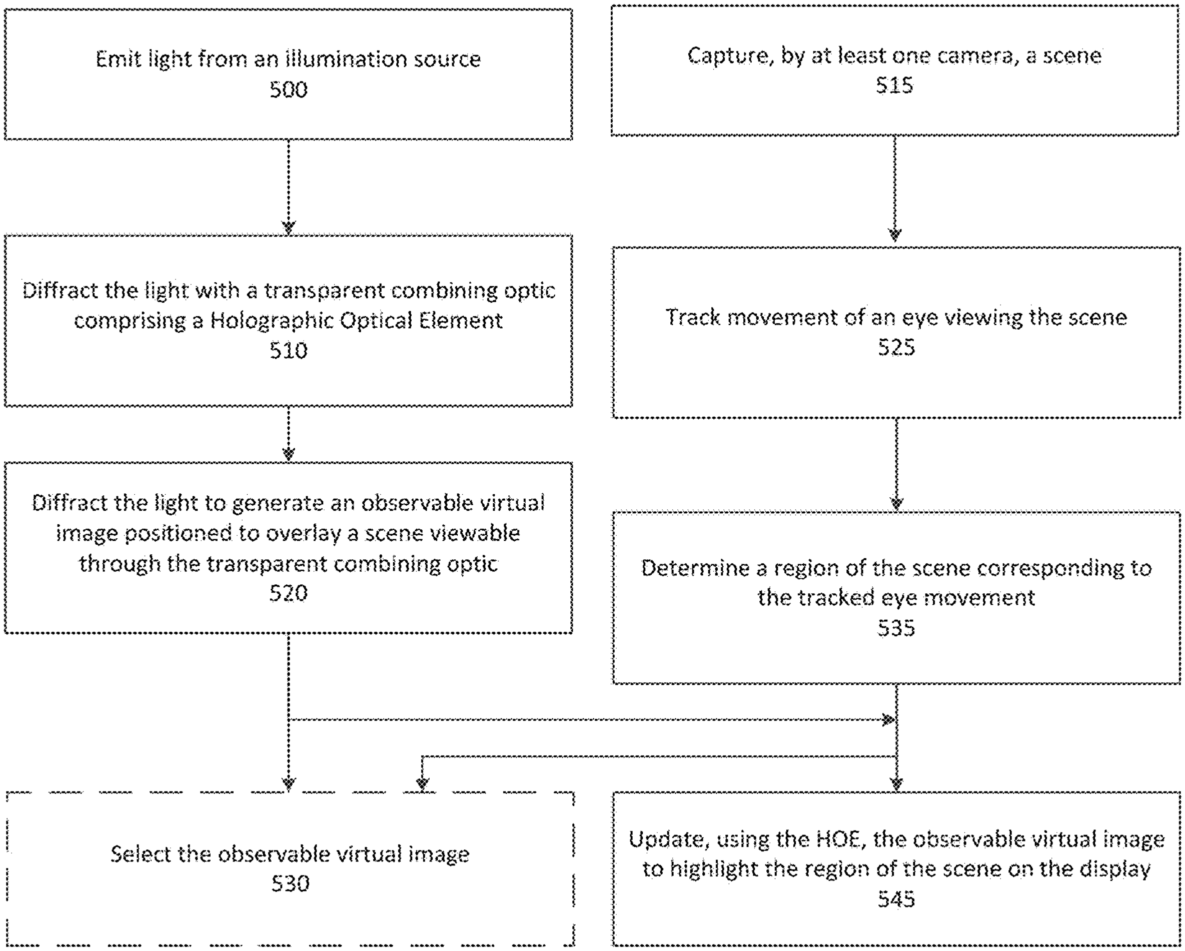
FIG. 5 illustrates a flowchart for producing observable virtual images in accordance with various aspects discussed herein.

FIG. 5 illustrates a flow chart for providing observable virtual images. At block 500, a device (e.g., head-mounted system 200) may emit light from an illumination source. As discussed herein, an illumination source may include one or more illumination sources, and any combination of types of illumination sources. For example, one or more LEDs, LCD displays, lasers, and/or the like.

At block 510, a device may diffract the light with a transparent combining optic comprising a holographic optical element (e.g., HOE 170*a*, 170*b*).

At block 520, a device (e.g., head-mounted system 200) may diffract the light with a HOE (e.g., HOE 170*a*, 170*b*) to generate/produce an observable virtual image (e.g., virtual image 220). The observable virtual image may be positioned to overlay a scene viewable through the transparent combining optic. As discussed herein, the transparent combining optic may comprise the HOE. The HOE may diffract the light in any of a plurality of ways to produce/generate a desired observable virtual image (e.g., virtual image 220). One or more HOEs (e.g., HOE 170*a*, 170*b*) may be applied to produce/generate one or more virtual images (e.g., virtual image 220). For example, a plurality of HOEs may work together to produce a desired virtual image. At least one illumination source (e.g., illumination source 160*a*, 160*b*) may illuminate an HOE. HOEs may include one or more multiplexed HOEs. Likewise, a plurality of illumination sources (e.g., illumination source 160*a*, 160*b*) may illuminate an HOE. Illumination sources (e.g., illumination source 160*a*, 160*b*) may provide separate, unique light. Illumination sources may also be variable illumination sources. The light from separate illumination sources may correspond with each other to produce/generate one or more observable virtual images, using one or more HOEs. According to other aspects, a first illumination source (e.g., illumination source 160*a*, or illumination source 160*b*) in the plurality of illumination sources and a second illumination source (e.g., illumination source 160*a*, or 160*b*) in the plurality of illumination sources may separately emit light to illuminate the HOE. The light from the first illumination source and the light from the second illumination source may project different images when diffracted by the HOE.

As discussed herein, the observable virtual image may be produced on a display (e.g., display 210), and may be provided on a head-mounted system, such as for example smart glasses, an AR system, a lens, and any of a variety of displays (e.g., system 100, head-mounted system 200, etc.). The display may be a transparent display, such as lenses on a glasses system. The observable virtual image (e.g., virtual image 220) may be one or more of a letter(s), a number(s), an icon(s), and/or the like. The image may be selectable, as discussed herein. Some aspects may provide a plurality of observable virtual images. The observable virtual image may be positioned to overlay a scene viewable through the transparent combining optic.

Operations of blocks 515-545 may occur separately, independently, and/or concurrently with the operations at blocks 510-530. Such operations may relate to capturing a region of an observable scene, using various systems and methods discussed herein.

At block 515, a device (e.g., head-mounted system 200) may capture a scene by at least one camera (e.g., sensor system 110*a*, 110*b*, 150*a*, 150*b*). The camera may be an outward-facing camera (e.g., sensor system 150*a*, 150*b*), capturing a scene viewable by a user, such as a camera mounted on a glasses frame (e.g., sensor system 110*a*, 110*b*, 150*a*, 150*b*).

At block 525, a device (e.g., head-mounted system 200) may track movement of an eye viewing the scene (e.g., using sensor system 110*a*, 110*b*, 150*a*, 150*b*). For example, a user wearing smart glasses may be viewing a scene also captured by the at least one camera.

At block 535, a device (e.g., head-mounted system 200) may determine a region of the scene corresponding to the tracked eye movement. The tracked eye movement may indicate where the user (e.g., one or more of the user's eyes) is focusing within the scene, and one or more regions of interest associated with the scene. In an example, at least one system (e.g., head-mounted system 200) may track movement of an eye viewing the scene, determine a region of the scene corresponding to the tracked eye movement, and update the observable virtual image to highlight the region of the scene. For example, the tracked eye movement, by the sensor system, may correspond to field of views 140*a*, 140*b*.

At block 545, a device (e.g., head-mounted system 200) may update, using the HOE, the observable virtual image to highlight the region of the scene on the display (see, e.g., FIG. 2, 3A, 3B). Highlighting the region may include providing a bounding box (e.g., viewable area 320) around the region of the scene of interest or providing another image corresponding to the region of the scene of interest (e.g., miniaturized replication 340) within the scene (e.g., scene 330).

Optionally, at block 530, a device (e.g., head-mounted system 200) may select the observable virtual image (e.g., observable virtual image 320, miniaturized replication 340). The selection may occur, for example, based on a length of a user's gaze on the area (e.g., a predetermined period of time, such as 1, 2, 3, seconds, etc.) Other actions, such as a selection of a button on a glasses frame, may select the observable virtual image.) Such operations may be optional, as not all observable virtual images may be selectable, and not all selectable observable virtual images may need to be selected. According to various aspects, selection of an observable virtual image (e.g., observable virtual image 320) may cause an action to be taken, such as capturing a photograph/image and/or taking a video of an area within the observable virtual image. Other actions may be associated with selecting the observable virtual image to provide additional information, such as time, battery information, system information, and/or any of a plurality of icons, applications (apps), and/or indications which may be provided by the observable virtual image.

Figure 6:
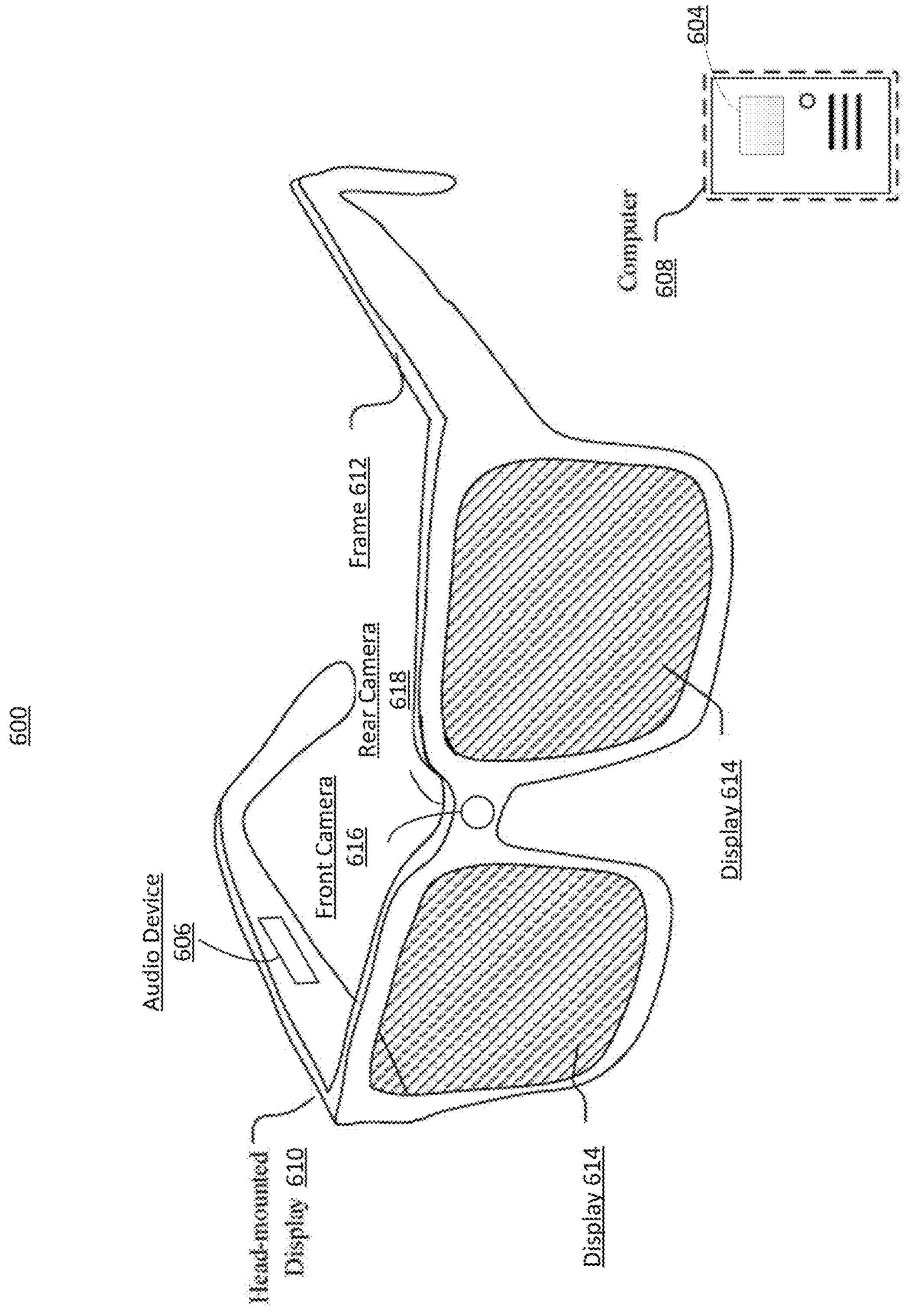
FIG. 6 illustrates an augmented reality system comprising a headset, in accordance with various aspects discussed herein.

In some examples, the augmented reality system 600 of FIG. 6 may perform the operations/functions of blocks 500, 510, 520, 530 and blocks 515, 525, 535, 545. In some other examples, the system 100 of FIG. 1A, the UE 30 of FIG. 7, the computing system 800 of FIG. 8, the framework 900 of FIG. 9 and/or the computer system 1000 of FIG. 10 may perform some, or all, of the operations/functions of blocks 500, 510, 520, 530 and blocks 515, 525, 535, 545.

In one example, the illumination source may include a first illumination source and a second illumination source separately emitting light, the HOE may be a multiplexed HOE, and a plurality of observable virtual images may be generated. The observable virtual images may be propagated through free space. In a multiplexed, HOE, multiple channels (e.g., digital or analog signals) are combined into a composite signal, which may generate the observable virtual image. In another example, the illumination source may be a variable illumination source, the HOE may be a multiplexed HOE, and a plurality of observable virtual images may be generated, with at least one observable virtual image being selectable.

FIG. 6 illustrates an example augmented reality system 600. In some examples, the augmented reality system 600 may be an example of the head-mounted system 200. The augmented reality system 600 may include a head-mounted display (HMD) 610 (e.g., glasses) comprising a frame 612, one or more displays 614, and a computer 608 (also referred to herein as computing device 608). The displays 614 may be transparent or translucent allowing a user wearing the HMD 610 to look through the displays 614 to see the real world and displaying visual augmented reality content to the user at the same time. The HMD 610 may include an audio device 606 (e.g., speaker/microphone 38 of FIG. 7) that may provide audio augmented reality content to users. The HMD 610 may include one or more cameras 616, 618 which may capture images and/or videos of environments. The HMD 610 may include an eye tracking system to track the vergence movement of the user wearing the HMD 610. In one example embodiment, the HMD 610 may include a camera (s) 618 (also referred to herein as rear camera 618) which may be a rear-facing camera tracking movement and/or gaze of a user's eyes.

One of the cameras 616 (also referred to herein as front camera 616) may be a forward-facing camera capturing images and/or videos of the environment that a user wearing the HMD 610 may view. The HMD 610 may include an eye tracking system to track the vergence movement of the user wearing the HMD 610. In one example, the camera(s) 618 may be the eye tracking system. The HMD 610 may include a microphone of the audio device 606 to capture voice input from the user. The augmented reality system 600 may further include a controller 604 (e.g., processor 32 of FIG. 7) comprising a trackpad and one or more buttons. The controller 604 may receive inputs from users and relay the inputs to the computing device 608. The controller 604 may also provide haptic feedback to users. The computing device 608 may be connected to the HMD 610 and the controller 604 through cables and/or wireless connections. The computing device 608 may control the HMD 610 and the controller 604 to provide the augmented reality content to and receive inputs from one or more users. In some example embodiments, the controller 604 may be a standalone controller or integrated within the HMD 610. The computing device 608 may be a standalone host computer device, an on-board computer device integrated with the HMD 610, a mobile device, or any other hardware platform capable of providing augmented reality content to and receiving inputs from users. In some examples, HMD 610 may include an augmented reality system/virtual reality system (e.g., artificial reality system).

Figure 7:
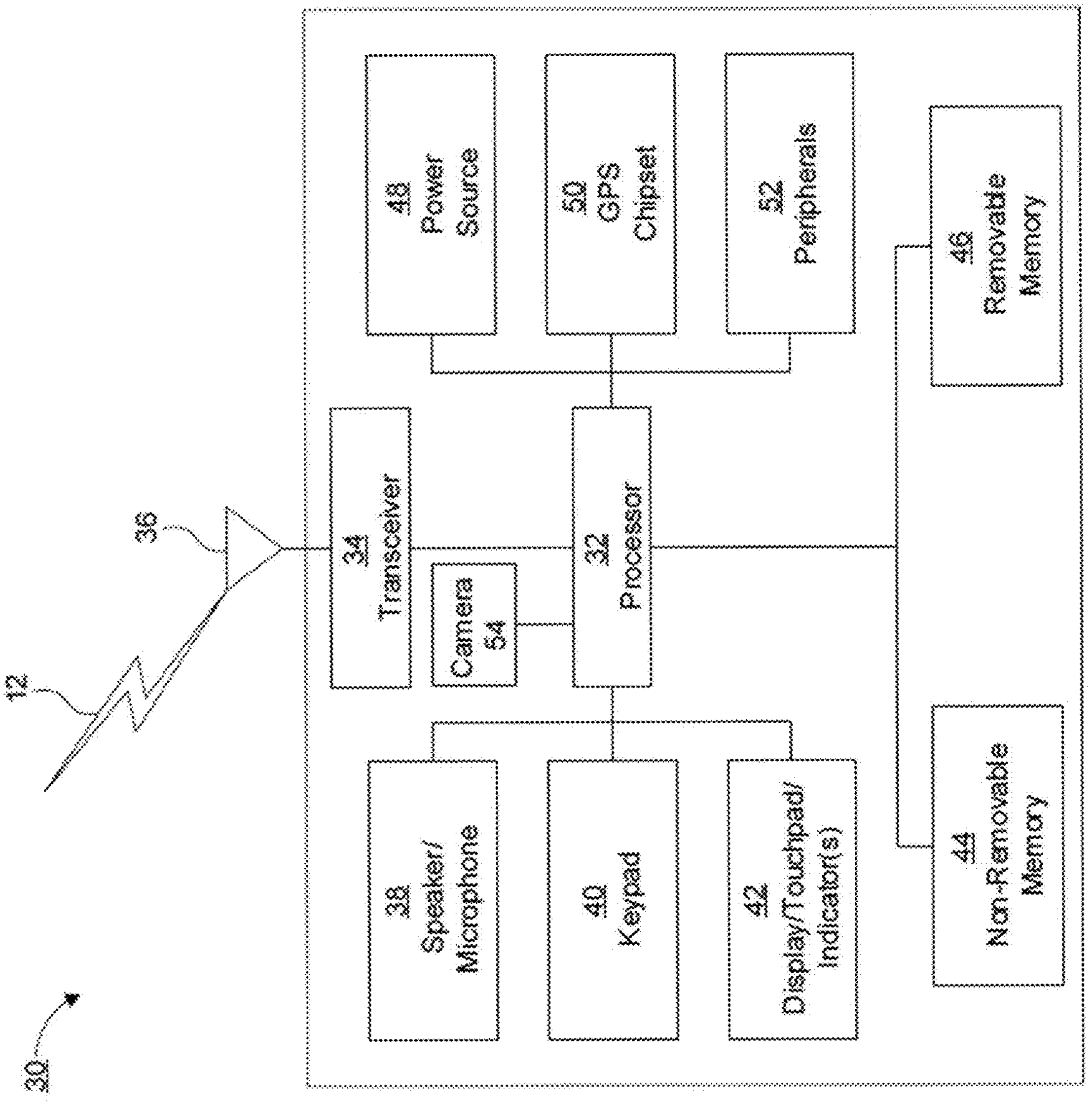
FIG. 7 illustrates a block diagram of an example device in accordance with various aspects discussed herein.

FIG. 7 illustrates a block diagram of an example hardware/software architecture of a UE 30. As shown in FIG. 7, the UE 30 (also referred to herein as node 30) may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The UE 30 may also include a camera 54. In an example, the camera 54 may be a smart camera configured to sense images appearing within one or more bounding boxes. The UE 30 may also include communication circuitry, such as a transceiver 34 and a transmit/receive element 36. It will be appreciated the UE 30 may include any sub-combination of the foregoing elements while remaining consistent with an embodiment.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., non-removable memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment. For example, in an embodiment, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another embodiment, the transmit/receive element 36 may be configured to transmit and receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48 and may be configured to distribute and/or control the power to the other components in the node 30. The power source 48 may be any suitable device for powering the node 30. For example, the power source 48 may include one or more dry cell batteries (e.g., nickel-cadmium (NiCad), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the node 30. It will be appreciated that the node 30 may acquire location information by way of any suitable location-determination method while remaining consistent with an example.

Figure 8:
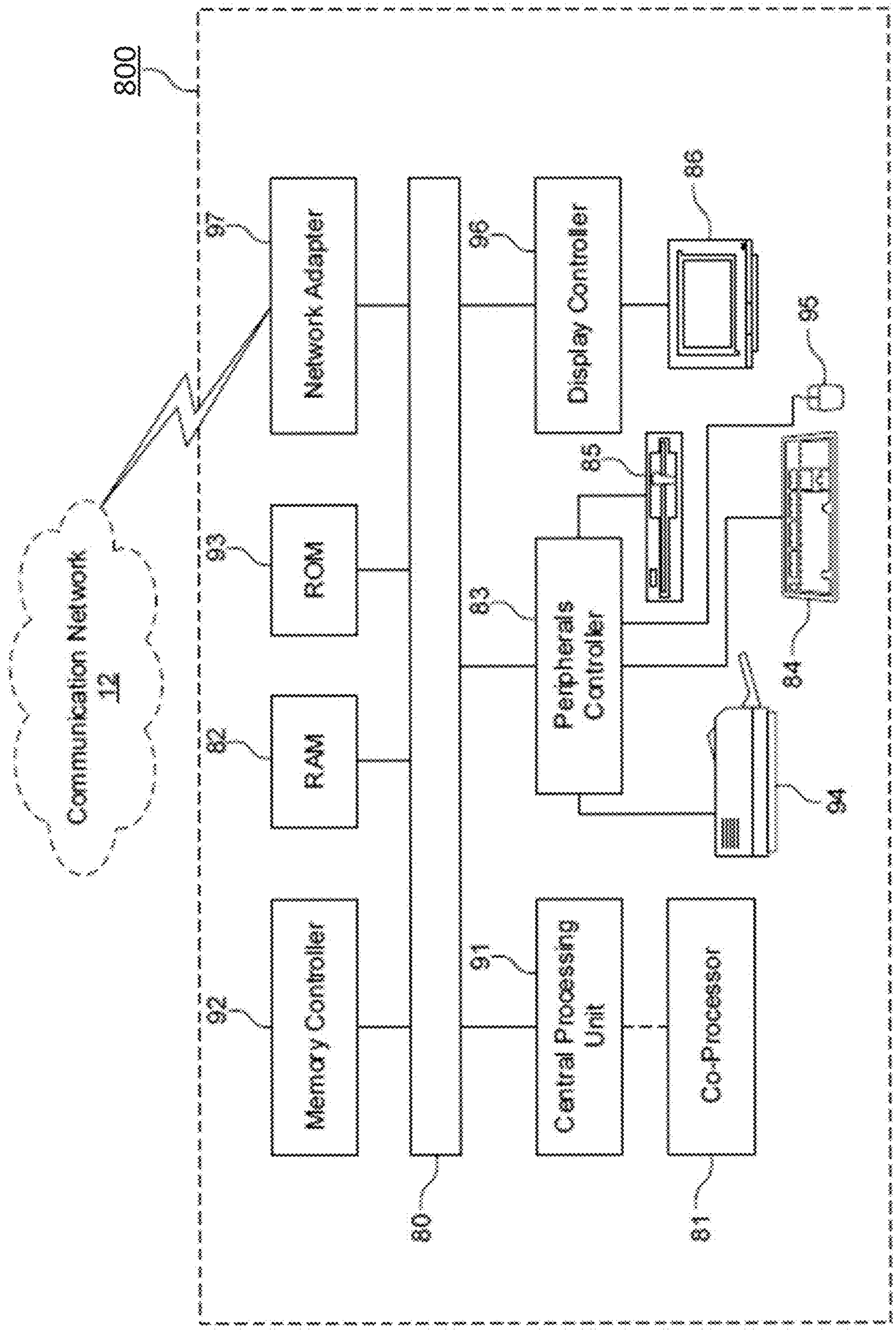
FIG. 8 illustrates a block diagram of an example computing system in accordance with various aspects discussed herein.

FIG. 8 is a block diagram of a computing system 800 which may also be used to implement components of the system or be part of the UE 30. The computing system 800 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 800 to operate. In many workstations, servers, and personal computers, central processing unit 91 may be implemented by a single-chip CPU called a microprocessor. In other machines, the central processing unit 91 may comprise multiple processors. Coprocessor 81 may be an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 800 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus.

Memories coupled to system bus 80 include RAM 82 and ROM 93. Such memories may include circuitry that allows information to be stored and retrieved. ROMs 93 generally contain stored data that may not easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it may not access memory within another process's virtual address space unless memory sharing between the processes has been set up.

In addition, computing system 800 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 800. Such visual output may include text, graphics, animated graphics, and video. Display 86 may be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 800 may contain communication circuitry, such as for example a network adaptor 97, that may be used to connect computing system 800 to an external communications network, such as network 12 of FIG. 7, to enable the computing system 800 to communicate with other nodes (e.g., UE 30) of the network.

Figure 9:
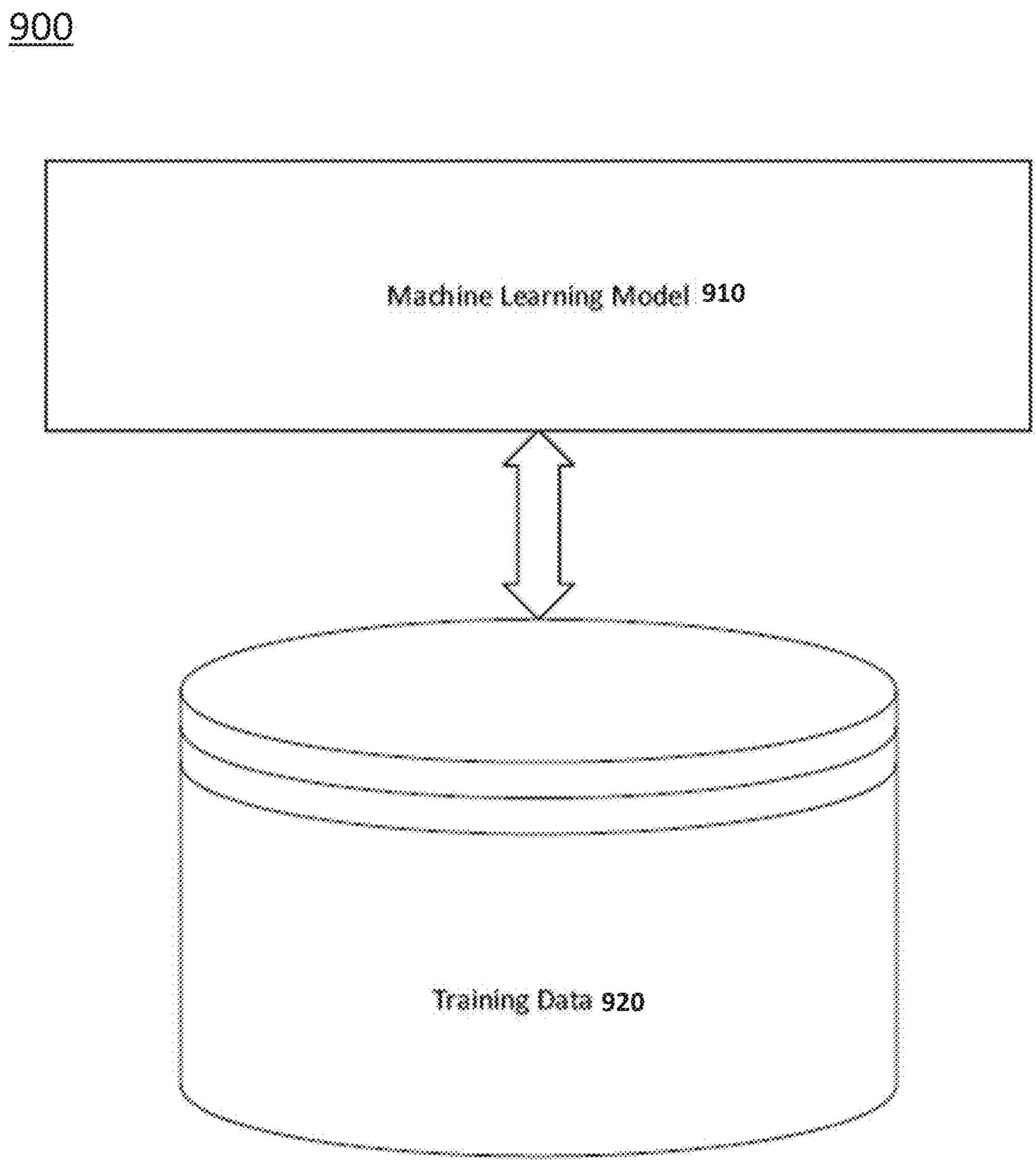
FIG. 9 illustrates a machine learning and training model in accordance with various aspects discussed herein.

FIG. 9 illustrates a framework 900 employed by a software application (e.g., computer code, a computer program) for providing observable virtual images. The framework 900 may be hosted remotely. Alternatively, the framework 900 may reside within the UE 30 shown in FIG. 7 and/or may be processed by the computing system 800 shown in FIG. 8 and/or by the augmented reality system 600 of FIG. 6. The machine learning model 910 is operably coupled to the stored training data 920 in a database.

In an example, the training data 920 may include attributes of thousands of objects. For example, the object(s) may be identified and/or associated with scenes, photographs/images, videos, regions (e.g., regions of interest), objects, eye positions, movements, pupil sizes, eye positions associated with various positions and/or the like. Attributes may include but are not limited to the size, shape, orientation, position of an object, i.e., within a scene, an eye, a gaze, etc. The training data 920 employed by the machine learning model 910 may be fixed or updated periodically. Alternatively, the training data 920 may be updated in real-time based upon the evaluations performed by the machine learning model 910 in a non-training mode. This is illustrated by the double-sided arrow connecting the machine learning model 910 and stored training data 920.

In operation, the machine learning model 910 may evaluate attributes of images/videos obtained by hardware (e.g., of the augmented reality system 600, UE 30, etc.). For example, the front camera 616 and/or rear camera 618 of the augmented reality system 600 and/or camera 54 of the UE 30 shown in FIG. 7 senses and captures an image/video, such as for example approaching or departing objects, object interactions, eye movements tracked over time, correlations between eye movements and scene objects/events, positioning of images on a lens display, and/or other objects appearing in or around a bounding box of a software application. The attributes of the captured image (e.g., captured image of an object or person may then be compared with respective attributes of stored training data 920 (e.g., prestored objects). The likelihood of similarity between each of the obtained attributes (e.g., of the captured image of an object (s)) and the stored training data 920 (e.g., prestored objects) is given a determined confidence score. In one example, if the confidence score exceeds a predetermined threshold, the attribute is included in an image description that is ultimately communicated to the user via a user interface of a computing device (e.g., UE 30, computing system 800). In another example, the description may include a certain number of attributes which exceed a predetermined threshold to share with the user. The sensitivity of sharing more or less attributes may be customized based upon the needs of the particular user.

Figure 10:
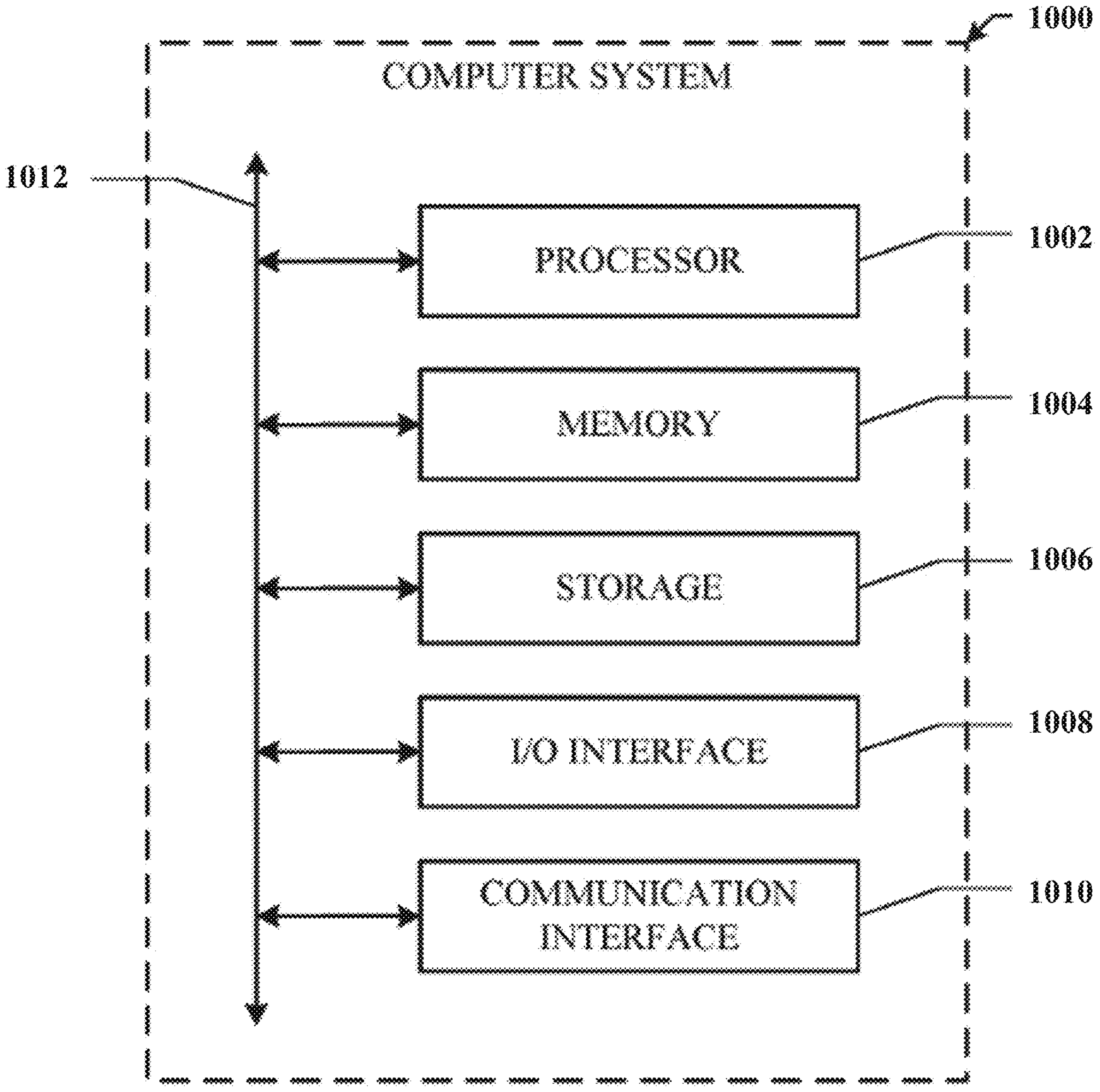
FIG. 10 illustrates a computing system in accordance with various aspects discussed herein.

FIG. 10 illustrates an example computer system 1000. In examples, one or more computer systems 1000 perform one or more steps of one or more methods described or illustrated herein. In particular embodiments, one or more computer systems 1000 provide functionality described or illustrated herein. In examples, software running on one or more computer systems 1000 performs one or more steps of one or more methods described or illustrated herein or provides functionality described or illustrated herein. Examples include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In examples, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In examples, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In examples, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In examples, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In examples, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In examples, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In examples, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In examples, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, computer readable medium or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed:

1. A system comprising:

a first camera configured to track movement of at least one eye of a user;

a transparent combining optic configured to diffract light from an illumination source to generate an observable virtual image, the virtual image overlaying a portion of a real-world environment; and a processor configured to instruct, responsive to a gaze of the user being focused on the virtual image for a time frame, a second camera to capture an image of the portion of the real-world environment upon which the virtual image is overlaid.

2. The system of claim 1, wherein the illumination source emits light on a display and wherein the illumination source comprises a plurality of illumination sources.

3. The system of claim 2, wherein a first illumination source of the plurality of illumination sources and a second illumination source of the plurality of illumination sources separately emit light to illuminate the transparent combining optic, the transparent combining optic including holographic optical element (HOE).

4. The system of claim 3, wherein first light from the first illumination source and second light from the second illumination source project different images in response to being diffracted by the HOE.

5. The system of claim 3, wherein the HOE comprises a multiplexed HOE.

6. The system of claim 3, wherein the observable virtual image is selectable to initiate an interactive action.

7. The system of claim 1, wherein the observable virtual image comprises a plurality of observable virtual images.

8. The system of claim 1, wherein the illumination source comprises a variable illumination source.

9. The system of claim 1, wherein the illumination source emits light on a display that is part of a head-mounted display device.

10. The system of claim 9, wherein the head-mounted display device comprises at least one of a headset, glasses, a helmet, a visor, a gaming device, or a smart device.

11. The system of claim 1, wherein the observable virtual image comprises at least one of a time, a letter, a number, a shape, or an icon.

12. The system of claim 1, further comprising:

at least one camera capturing a scene, wherein the observable virtual image is a section of the scene captured by the at least one camera.

13. A method comprising:

tracking movement of at least one eye of a user using a first camera;

diffracting light emitted from an illumination source by utilizing a holographic optical element (HOE) to generate an observable virtual image that overlays a portion of a real-world environment; and instructing, by a processor, responsive to a gaze of the user being focused on the virtual image for a time frame, a second camera to capture an image of the portion of the real-world environment upon which the virtual image is overlaid.

14. A non-transitory computer readable medium including computer-executable instructions, which when executed cause:

a first camera to track movement of at least one eye of a user;

a transparent combining optic comprising a holographic optical element (HOE) to diffract light from an illumination source to generate an observable virtual image, the observable virtual image overlaying a portion of a real-world environment; and a processor to instruct, responsive to a gaze of the user being focused on the virtual image for a time frame, a second camera to capture an image of the portion of the real-world environment upon which the virtual image is overlaid.

15. The non-transitory computer readable medium of claim 14, wherein:

the illumination source comprises a first illumination source configured to emit first light and a second illumination source configured to emit second light;

the HOE comprises a multiplexed HOE; and the observable virtual image comprises a plurality of observable virtual images.

16. The non-transitory computer readable medium of claim 14, wherein:

the illumination source comprises a variable illumination source;

the HOE comprises a multiplexed HOE; and the observable virtual image comprises a plurality of observable virtual images, wherein a first observable virtual image is selectable to initiate an interactive action.

* * * * *